(12) United States Patent
Canterberry et al.

(10) Patent No.: US 6,487,974 B1
(45) Date of Patent: Dec. 3, 2002

(54) INFLATOR

(75) Inventors: J B Canterberry, Apollo Beach, FL (US); Samuel Steven Schlueter, Plant City, FL (US); John Herman Adams, Lakeland, FL (US); Robert Keith Walsh, Lakeland, FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/685,617

(22) Filed: Oct. 10, 2000

Related U.S. Application Data

(62) Division of application No. 08/912,106, filed on Aug. 18, 1997, now Pat. No. 6,214,138.

(51) Int. Cl.[7] .................................................. C06D 5/00
(52) U.S. Cl. ......................... 102/531; 149/36; 149/43; 149/61; 280/741
(58) Field of Search .............................. 149/36, 43, 61; 280/741; 102/531

(56) References Cited

U.S. PATENT DOCUMENTS

| | | | |
|---|---|---|---|
| 4,244,758 A | 1/1981 | Garner et al. | 149/7 |
| 4,865,635 A | 9/1989 | Cuevas | 55/276 |
| 4,902,036 A | 2/1990 | Zander et al. | 280/736 |
| 4,923,212 A | 5/1990 | Cuevas | 280/736 |
| 4,948,439 A | 8/1990 | Poole et al. | 149/36 |
| 5,016,914 A | 5/1991 | Faigle et al. | 280/741 |
| 5,035,750 A | 7/1991 | Poole | 149/61 |
| 5,035,757 A | 7/1991 | Poole | 149/46 |
| 5,084,118 A | 1/1992 | Poole | 149/22 |
| 5,139,588 A * | 8/1992 | Poole | 149/61 |
| 5,380,380 A | 1/1995 | Poole et al. | 149/36 |
| 5,431,103 A * | 7/1995 | Hock et al. | 102/287 |
| 5,439,537 A | 8/1995 | Hinshaw et al. | 149/22 |
| 5,472,534 A * | 12/1995 | Wardle et al. | 149/36 |
| 5,514,230 A | 5/1996 | Khandhadia et al. | 149/36 |
| 5,516,377 A | 5/1996 | Highsmith et al. | 149/36 |
| 5,518,054 A | 5/1996 | Mitson et al. | 149/35 |
| 5,529,647 A * | 6/1996 | Taylor et al. | 149/61 |
| 5,551,725 A | 9/1996 | Ludwig | 280/737 |
| 5,589,141 A | 12/1996 | Sides et al. | 280/741 |
| 5,592,812 A | 1/1997 | Hinshaw et al. | 149/36 |
| 5,622,380 A | 4/1997 | Khandhadia et al. | 280/736 |
| 5,650,590 A * | 7/1997 | Taylor | 149/17 |
| 5,656,793 A | 8/1997 | Ochi et al. | 149/22 |
| 5,739,460 A | 4/1998 | Knowlton et al. | 102/324 |
| 5,936,195 A * | 8/1999 | Wheatley | 149/43 |
| 5,959,242 A | 9/1999 | Knowlton et al. | 149/36 |
| 5,962,808 A * | 10/1999 | Lundstrom | 149/43 |
| 6,416,599 B1 * | 7/2002 | Yoshikawa et al. | 149/61 |

FOREIGN PATENT DOCUMENTS

| | | |
|---|---|---|
| DE | 19840993 | 3/2000 |
| WO | WO9720786 | 6/1997 |
| WO | WO9806683 | 2/1998 |

\* cited by examiner

*Primary Examiner*—Edward A. Miller
(74) *Attorney, Agent, or Firm*—Jarett Rieger

(57) ABSTRACT

An ignition enhancer and gas heater composition for vehicle occupant restraint systems (commonly known as "airbags") contains a non-azide fuel, an oxidizer and a metal. The ignition enhancer composition provides reliable and consistent ignition of a main propellant composition to produce a sufficient amount of gas to inflate an attached airbag within ten to eighty milliseconds or successfully heat the stored gas in a hybrid system. In a preferred embodiment, the enhancer composition contains 5-aminotetrazole, strontium nitrate, boron nitride, mica or clay and aluminum.

4 Claims, 4 Drawing Sheets

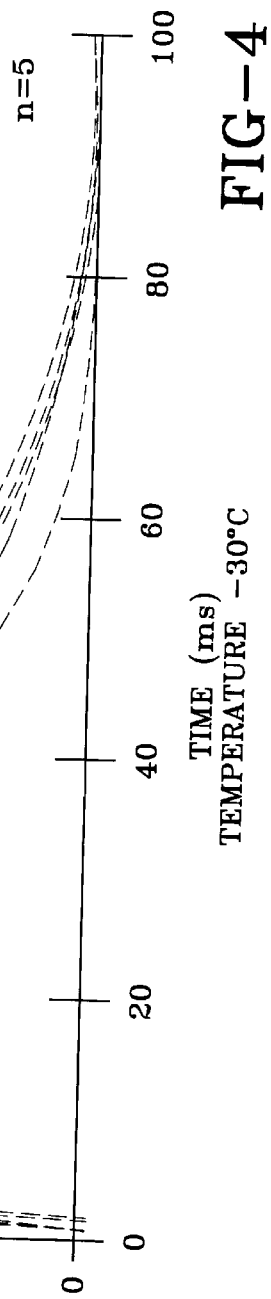

INFLATOR

This is a Divisional of application Ser. No. 08/912,106 filed Aug. 18, 1997, now U.S. Pat. No. 6,214,138.

FIELD OF THE INVENTION

The present invention relates generally to inflatable vehicle occupant restraint systems (commonly known as "airbags") and more specifically to ignition enhancers and hybrid inflator gas heaters. More particularly, the enhancer compositions disclosed herein use tetrazoles and oxidizers in combination with specified metals to provide reliable ignition of a main gas generant charge. The enhancer compositions are also very effective as gas heaters in hybrid inflator systems as a result of the high combustion temperatures of the inventive compositions. The ignition enhancers disclosed herein are low in cost, provide pre-pressurization of the airbag inflator system to reliably ignite the gas generant compositions and efficiently heat the pressurized gas in a hybrid inflator system.

BACKGROUND OF THE INVENTION

Gas generating compositions are useful in a number of different applications. One important use for such compositions is in the operation of airbags. Airbags are gaining in acceptance to a point that many, if not most, new motor vehicles are equipped with such devices. Many new motor vehicles are equipped with multiple airbags to protect the driver and passengers.

A sufficient volume of gas must be generated in a motor vehicle airbag system to inflate the bag within a fraction of a second. Between the time the motor vehicle is impacted in a crash and the time the occupant would otherwise impact against the steering wheel, door or dashboard, the airbag must fully inflate. As a consequence, rapid gas generation is mandatory.

Both organic and inorganic materials have been proposed as possible gas generants. Such gas generant compositions include oxidizers and fuels which react at sufficiently high rates to produce large quantities of gas in a fraction of a second. At present, sodium azide is the most widely used and currently accepted gas generating material. However, numerous alternatives have been proposed to the sodium azide-based generants which overcome a number of problems associated with sodium azide (i.e., toxicity, cost, safety of handling and disposal concerns).

In addition to airbag systems based solely on gas generating compositions, hybrid inflator technologies have also been developed. Hybrid inflators generally require the heating of a stored, inert gas (i.e., argon or helium) to a desired temperature by igniting a small amount of a rapidly burning gas generating composition. Hybrid gas generating systems comprise a pressure vessel having a rupturable opening, a pre-determined amount of inert gas disposed within the pressure vessel, a gas generating composition for producing hot combustion gases and a means for rupturing the rupturable opening. The gas generating composition is configured and positioned relative to the pressure vessel so that hot combustion gases are mixed with and heat the inert gas. The mixed and heated gases exit the pressure vessel through an opening and ultimately exit the inflator to inflate an inflatable object.

In conventional pyrotechnic airbag inflators or in hybrid inflators, a combustion chain or series of combustion events is used to result in the inflation of the airbag. The combustion is begun by an ignition initiator, preferably an electrically activated squib which contains a small charge of an electrically ignitable composition. However, it is understood that any suitable ignition initiator, such as a stab initiator, may be used to practice the present invention. The ignition initiator is connected to at least one remote crash sensing device of a type well known in the art. The crash sensing device may be located, for example, in the front bumper and/or side fenders of a motor vehicle. As presently used in motor vehicles the squib with the electrically ignitable composition abuts against an enhancer packet or chamber containing a quantity of an ignitable enhancer composition such as a mixture of boron and potassium nitrate ($BKNO_3$). The enhancer composition is typically employed in powdered form to provide the maximum available burning surface for the fastest possible response, thereby rapidly igniting the main gas generating charge.

The present invention is directed to the discovery of an enhancer composition that can be used to replace the expensive and dangerous $BKNO_3$. Further, the enhancer composition of this invention provides reliable ignition of the main gas generant charge and the pre-pressurization of the inflator vessel so as to enhance the performance of the main gas generant composition. An unexpected advantage of this invention is that the enhancer composition is not required to be used in powdered form, allowing enhancements from production and safety perspectives. Additionally, the enhancer composition of the present invention reliably ignites the main gas generant composition over a wide temperature range, whether it be azide or non-azide based.

Thus, in operation of a preferred embodiment, a signal from a crash sensor results in the initiation of a charge within the squib which then ignites a charge within the body of the squib. A stream of hot gases and particles produced by this combustion is then directed into the enhancer composition disclosed herein whereupon the enhancer composition begins to burn. The rapid generation of hot gases and molten reaction products produced by the combustion of the enhancer composition impinges upon the main gas generant composition (sometimes referred to in the art as a "propellant") which itself begins to burn.

Typically, the main gas generant mixture is in the form of pellets or wafers. Preferably, the enhancer composition is also in the form of pellets. An appropriate amount of gas generant (enhancer plus main charge), calculated to produce an appropriate amount of gas to inflate the attached airbag within ten to eighty milliseconds, is placed within the gas generant vessel.

BRIEF DESCRIPTION OF THE DRAWINGS

FIG. 4 is a graphical representation of pressure versus time data obtained from the use of an enhancer composition according to the invention in conjunction with an azide based main gas generant as set forth in Example III.

SUMMARY OF THE INVENTION

Figure 1:
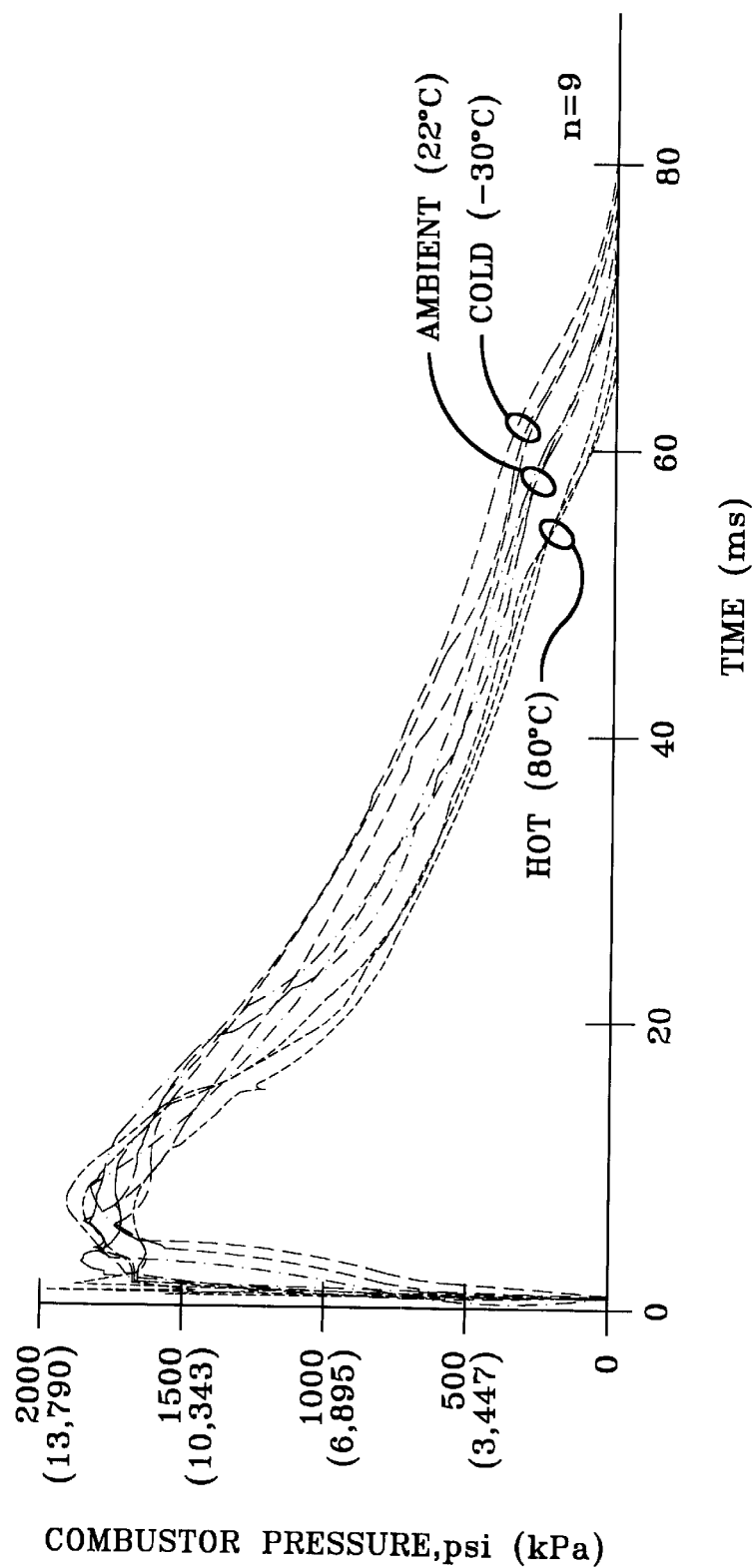
FIG. 1 is a graphical representation of pressure versus time data obtained from the use of an enhancer composition according to the present invention as set forth in Example I.

An important aspect of enhancer compositions according to the present invention is the reliable and consistent ignition of the main gas generant composition to produce a sufficient amount of gas to inflate an attached airbag within a ten to eighty millisecond period. An additional important aspect of the invention relates to the composition's ability to rapidly and reliably heat the stored gas in a hybrid inflator to the required temperature.

In one embodiment of the invention, the enhancer composition may be molded or extruded to conform to the size and shape of the enhancer cavity. In another embodiment, the inventive enhancer composition may be pressed into tablets or pellets. An additional important aspect of the invention relates to the relatively high level of metal in the enhancer composition which provides a sufficient amount of molten material to quickly ignite the main charge and heat the stored inert gas. One advantage of the enhancer composition of this invention is that it can easily be shaped into pellets or other forms that allow for its safe and cost-effective use in airbag inflation systems. Further, the specific compositions disclosed herein result in combustion temperatures of about 3,000° K or higher and sufficient gas production to result in the pre-pressurization of the combustion chamber prior to ignition of the main gas generant charge.

As used herein, all recited percentages are percents by weight of the component to the weight of the entire enhancer composition, unless stated otherwise.

Thus, there is disclosed an enhancer composition comprising: (a) a fuel selected from tetrazoles, triazoles, bi-tetrazoles and mixtures thereof at a concentration from 15 to 35 weight %; (b) an oxidizer selected from nitrates, chlorates, perchlorates and mixtures thereof, at a concentration from 50 to 80 weight %; and (c) a metal selected from aluminum, titanium, boron, magnesium, zinc, zirconium, silicon and mixtures thereof, at a concentration of 3 to 15 weight %.

There is further disclosed an airbag inflator comprising: (a) a main gas generant; (b) an ignition initiator; and (c) an enhancer composition as described herein.

The enhancer composition may also contain a processing aid selected from silicon dioxide, talc, boron nitride, molybdenum disulfide, metal stearate salts, mica, clays and mixtures thereof at a concentration of 0 to 5 weight %.

The composition of the present invention can also be advantageously used for hybrid inflators. Hybrid inflators utilize pyrotechnic compositions as gas heaters to provide the necessary inflation of an airbag. Thus, there is further disclosed an airbag inflator comprising: (a) a vessel containing a gas; and (b) a gas heater composition for heating the gas in said vessel, wherein said gas heater composition comprises: (I) a fuel selected from tetrazoles, triazoles, bitetrazoles and mixtures thereof at a concentration of from 15 to 35 weight %; (ii)an oxidizer selected from nitrates, chlorates, perchlorates and mixtures thereof at a concentration of from 50 to 80 weight %; and (iii) a metal selected from aluminum, titanium, boron, magnesium zirconium, zinc, silicon and mixtures thereof at a concentration of 3 to 15 weight %.

The enhancer composition of the present invention is different from the prior art, non-azide gas generants in that the combustion temperature has been dramatically increased through the manipulation of component levels and the inclusion of 3 to 15 weight % of a recited metal. Non-azide based generants typically include metal oxide coolants such as silicon dioxide to keep the combustion temperature as low as possible. Conventional non-azide gas generants also avoid the inclusion of metals, such as aluminum, at levels taught herein, as the production of excessively high gas temperatures, noxious gases and particulates would be increased beyond acceptable limits.

Another benefit of the enhancer composition of the present invention is that it is relatively friction insensitive. Friction sensitivity relates to a gas generant's tendency to explode or ignite when processed in a granulating or pelletizing machine. Processing aids such as mica, silicon dioxide and especially boron nitride are effective in controlling friction sensitivity of the composition of the present invention.

In a typical driver's side inflator configuration, about 0.2 to 3.0 gms of the enhancer composition is used to ignite from about 1.0 to about 100 gms of the main gas generant charge. In a preferred embodiment of the invention, a 5-aminotetrazole (5-AT) based enhancer composition is used to ignite a 5-AT based main gas generant charge. This use of 5-AT in both the enhancer and main charge reduces costs of producing the inflators as the need for separate storage and handling of $BKNO_3$ is eliminated.

There is further disclosed a vehicle passive restraint device comprising an airbag which, when deployed, is positioned between an occupant of a vehicle and the interior structure of the vehicle for protecting the occupant from an impact with the interior structure of the vehicle in the event of a crash. The present invention also discloses an inflator, comprising a main gas generant, an ignition initiator and an enhancer composition according to the composition disclosed above, for producing a sufficient quantity of a gaseous combustion product to inflate the airbag in an interval occurring between the sensing of a crash and the time when the vehicle occupant would impact with the interior structure of the vehicle.

Yet further disclosed is an enhancer composition for use in an airbag inflator which consists essentially of a fuel selected from tetrazoles at a concentration of from 15 to 35 weight %; an oxidizer selected from ammonium, alkaline earth and alkali metal nitrates, oxides, perchlorates and mixtures thereof at a concentration of from 50 to 80 weight %, a metal selected from aluminum, titanium, boron, magnesium, zirconium, zinc, silicon, and mixtures thereof at a concentration of 3 to 15 weight % having a particle size of 5–100 microns and at least one processing aid selected from silicon dioxide, mica, boron nitride, clay, talc, molybdenum disulfide, metal stearate salts and mixtures thereof at a concentration not greater than about 5 weight %.

DETAILED DESCRIPTION OF THE INVENTION

This application is related to two (2) presently pending applications in the United States Patent and Trademark Office in that they disclose non-azide based gas generants. The first application being Ser. No. 08/801,332 filed Feb. 19, 1997 entitled: AIRBAG INFLATOR EMPLOYING GAS GENERATING COMPOSITIONS CONTAINING MICA and the second being Ser. No. 08/801,376 filed Feb. 19, 1997 entitled: GAS GENERATING COMPOSITION CONTAINING MICA. These applications and the present application are assigned to or under an obligation to assign to the same entity. These applications disclose an air bag inflator comprising: (a) a metal housing; and (b) a gas generant comprising 5–25 weight % mica. These applications also disclose an airbag inflator wherein said metal housing comprises combustion gas ports which are sealed with a stainless steel foil; said stainless steel foil is of a thickness of 0.01 to 0.20 mm, said foil further characterized by an adhesive on at least one surface of said foil. The major advancement to the state of the art that these applications teach is the inclusion of mica in the gas generant composition to reduce the production of noxious gases and unfilterable particulates.

Fuels useful in the enhancer composition of the present invention include the azole compounds such as aminotetrazoles, triazoles, bi-tetrazoles and metal salts of these compounds. Triazole compounds such as 1,2,4-triazole-5-one or 3-nitro 1,2,4-triazole-5-one and metal salts of these compounds can also be used. The amount of fuel can range from 15–35 weight % with 25–30 weight % being more preferred. Fuel levels of about 26 weight % are most preferred for the enhancer composition of the present invention.

Oxidizers useful in the present invention include the alkali or alkaline earth metal nitrates, perchlorates, chlorates and oxides or mixtures thereof. Ammonium nitrate or perchlorate can also be used with strontium nitrate being a preferred oxidizer. The level of oxidizer can range from about 50–80 weight % of the enhancer composition. Levels of 60–65 weight % are more preferred with levels of about 64 weight % being the most preferred.

Metals useful in this invention include aluminum, boron, silicon, magnesium, manganese, zirconium, zinc, silicon, titanium and mixtures thereof. The preferred metal is aluminum. The particle size of the metal is preferably in the range of 5 microns to 100 microns. The more preferred size is 22 to 30 microns. The metal content in the enhancer composition is preferred in the range of 3 to 15 weight %. The level of metal in the enhancer is critical to the proper functioning of the enhancer composition as it acts as a heat source which allows the enhancer composition to rapidly ignite the main gas generant charge or heat the stored gas. A more preferred level of metal is 7 to 11 weight % with about 7 weight % being the most preferred.

A binder or processing aid may also be present in the enhancer composition to facilitate the molding or pelletizing of the enhancer. Binders such as alkaline earth, alkali metal and alumino silicates have been found useful. Mica has also been found to be a useful binder and processing aid. Boron nitride, molybdenum disulfide and metal stearate salts have also been found to be very useful as lubricants and desensitizing agents which allow for pelletizing of the enhancer. Silicon dioxide and clays may also be included in the enhancer composition. Binder/processing aid levels typically are less than 7 weight % of the composition.

The major advantages of the inventive enhancer composition over the prior art $BKNO_3$ enhancer composition includes a significant reduction in cost and the pre-pressurization of the inflator combustion chamber, thereby significantly improving the combustion properties of the main generant. The enhancer composition of this invention can be used with azide based gas generants, with the non-azide based generants and in hybrid systems.

Figure 3:
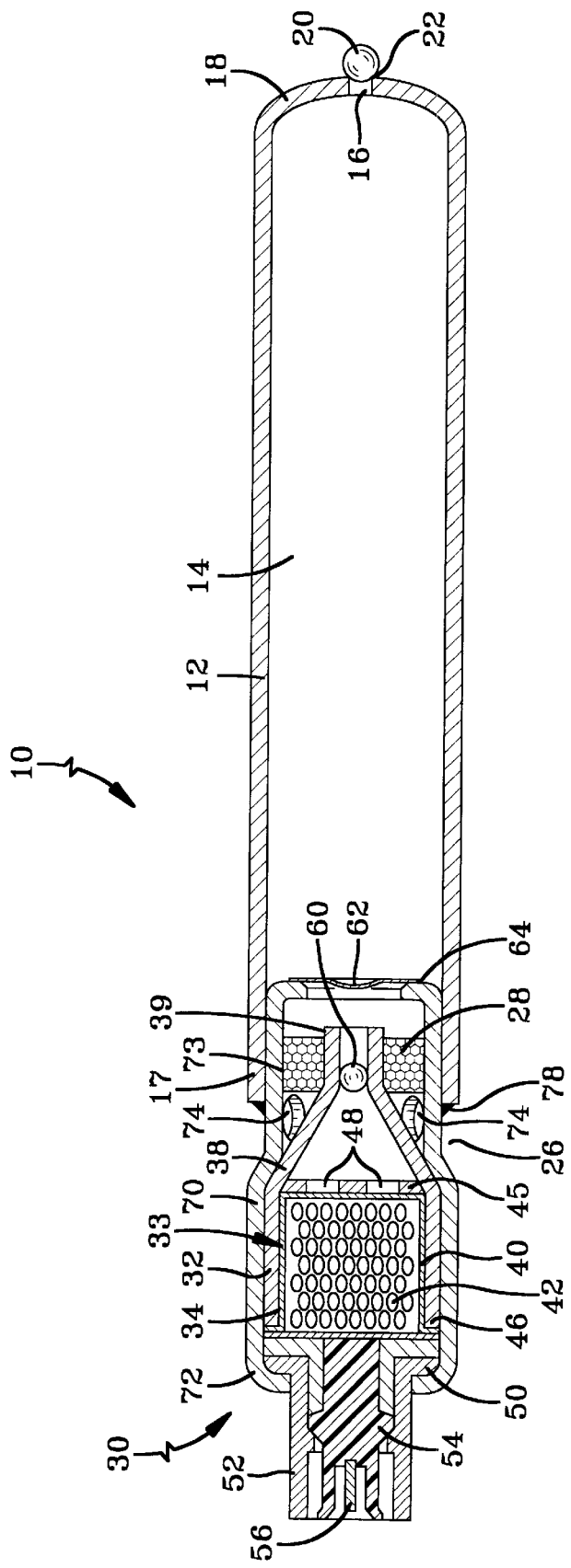
FIG. 3 is a longitudinal cross-sectional view of a representative hybrid inflator which employs the composition of the present invention as a gas heater.

In hybrid systems, a composition according to the present invention is especially useful, as the high heat of reaction and the speed of the burn allow for the rapid heating of the pressurized gas. To better understand how the compositions of the invention can be used in a hybrid system, reference is made to FIG. 3. FIG. 3 shows, in longitudinal cross-sectional view, an example of a hybrid inflator 10 which employs the compositions of the present invention as a gas heater to heat the stored gas. Such a hybrid inflator can be used for inflating a vehicle occupant restraint such as an airbag. It is understood that the hybrid inflator shown illustrated in FIG. 3 and described herein is only one example of a hybrid inflator that may employ the compositions of the present invention to heat stored gas.

The hybrid inflator 10 includes a pressure vessel 12 with a storage chamber 14 that is filled with helium, argon, nitrogen or any other suitable inert pressurized gas. While the pressure vessel shown has a generally cylindrical shape, with a circular cross section, it is understood that a pressure vessel having other shapes may also be used in the practice of the present invention. A fill port 16 located at a first end 18 of the pressure vessel 12 is closed by a plug 20 which is attached to the pressure vessel by a weld 22. The pressure vessel may be formed of stainless steel, low carbon steel or any other suitable material which has sufficient strength and extremely low permeability to the gas.

A plenum 26 is formed by the pressure vessel 12 and the diffuser 70. The plenum 26 is formed by: (a) the end of the larger diameter section of the diffuser housing; (b) the reduced diameter section of the diffuser housing; and (c) the proximal end of the pressure vessel. The diffuser 70 has a plurality of openings 74 therethrough for venting gas from the inflator to a vehicle occupant restraint. The annulus, or plenum, which is outside the diffuser in juxtaposition with the openings 74 allows the gas to evenly disperse in 360° of direction.

The hybrid inflator 10 also includes a pyrotechnic heater assembly 30. Forming the outer periphery of the pyrotechnic heater assembly 30 is a generally cylindrical diffuser 70. The diffuser may be formed of stainless steel, low carbon steel or any other suitable material having sufficient structural strength. The generally cylindrical diffuser is telescopically inserted into the generally cylindrical vessel. The diffuser is connected to the cylindrical vessel by a circumferential weld 78, which is preferably a fillet weld. That is to say, the open end 17 of the pressure vessel 12 is joined in sealing relationship with the diffuser 70 by a circumferential weld 78.

In this exemplary hybrid inflator the diffuser has a reduced diameter portion which is located inside the pressure vessel and defines a circular opening having an area which is in the range of 40% to 60% of the area of the circular cross section of said storage chamber. The end 64 of the diffuser, which is located inside the vessel, is assembled with a closure 62 which seals the pressurized gas within the storage chamber 14. The closure is preferably formed of stainless steel or any other material which is corrosion resistant, has extremely low permeability to the stored gas, and has stable mechanical properties over a wide range of temperatures. The closure is plastically deformable, as shown in FIG. 3, by the pressure exerted by the inert gas in the storage chamber. The closure 62 may be attached to the diffuser 70 by a weld. A second end 72 of the diffuser 70 is crimped over an igniter retainer assembly 52. Located inside the igniter retainer assembly 52 is an igniter 54. The igniter 54 communicates with a sensor means (not shown) via electric contact pins 56. The sensor means can be of any type presently used in the art to sense a collision or sudden deceleration of a vehicle.

A sleeve 32, which is tapered at a first end 38 to form a nozzle 39, is located within the diffuser 70. Surrounding the nozzle 39 of the sleeve 32 is a filter 28 which fits against the inside 73 of the diffuser 70 and is located between the end of the nozzle and the openings through the diffuser.

The sleeve 32 cooperates with the igniter 54 and support ring 50 to define a combustion chamber 33. A package 40 which contains a solid gas generating composition 42 of the present invention hermetically sealed within the package. The package may be formed of aluminum or any suitable material which may be hermetically sealed. A collar at a first end 46 of the package is clamped between the support ring 50 and the second end 34 of the sleeve 32. The support ring and igniter support the first end 46 of the package 40 against the pressure created when the gas generating composition is ignited.

An orifice plate 45 having a plurality of orifices 48 therethrough is secured in the tapered portion 38 of the sleeve 32 sandwiched between the package 40 and the sleeve 32. With this orifice plate 45 to support the package, the second end of the package ruptures at an elevated temperature and pressure when the gas generating composition is ignited. The resultant flow of hot generated gas is at an elevated temperature and pressure and passes through the orifices 48 in the orifice plate and nozzle 39 to rupture the closure 62, creating an orifice through the closure. The hot generated gas enters the storage chamber 14 and heats the pressurized gas stored therein, causing the stored gas to expand and exit the storage chamber at a much faster rate than it would if the gas were at only ambient temperature. The hot gas passes through the filter 73 and exits the inflator via the orifices 74 in the diffuser 70.

The compositions of the present invention are able to rapidly ignite the gas generant or heat the stored gas at temperatures ranging from minus 40° C. to plus 90° C. The combustion temperature of the enhancer composition of the invention will exceed 2800° K (2550° C.) and preferably 3000° K (2750° C.). Total heat output of the enhancer should exceed 700 calories/gm, and preferably 850 calories/gm.

A preferred enhancer composition according to the invention consists essentially of 26 weight % 5-aminotetrazole, 64 weight % strontium nitrate, 2 weight % mica, 1 weight % boron nitride and 7 weight % aluminum. The particle size of the aluminum is preferably 22 to 30 microns and the aluminum is atomized. The combustion temperature of this composition is about 2855° C. (3105° K) with a total heat content of about 887 calories/gm. Varying the metal and its level can have a dramatic impact on the enhancer's combustion temperature and gas output. The following Table 1 sets forth enhancer compositions that are 28 weight % 5-aminotetrazole, 61 weight % strontium nitrate, mica at from 0 to 7 weight % and various metals at from 3 to 11 weight %. The values for combustion temperatures, heat content and gas volume were calculated using a program known as "NEWPEP" which is based on the PEP program described in a Naval Weapons Center Report entitled "Theoretical Computations of Equilibrium Composition, Thermodynamic Properties, and Performance Characteristics of Propellant Systems", published in 1960, 1979 and 1990. This program is in the public domain and is readily available to those in the industry.

TABLE 1

Representative Enhancer Compositions of the Invention
Combustion Temperature, Heat Content and Gas Volume

| Metal | Metal % | Mica % | Combustion Temp (° K.) | Heat content cal/gm | Gas Volume Moles/100 g |
|---|---|---|---|---|---|
| Al | 3 | 6 | 3128 | 832 | 2.01 |
| Al | 4 | 7 | 3037 | 821 | 2.03 |
| Al | 5 | 6 | 2938 | 821 | 2.03 |
| Al | 6 | 5 | 2895 | 805 | 2.06 |
| Ti | 10 | 1 | 3031 | 799 | 1.97 |
| Ti | 11 | 0 | 3090 | 814 | 1.96 |
| B | 9 | 1 | 2932 | 743 | 2.12 |
| Mg | 9 | 2 | 3106 | 859 | 2.02 |

TABLE 1-continued

Representative Enhancer Compositions of the Invention
Combustion Temperature, Heat Content and Gas Volume

| Metal | Metal % | Mica % | Combustion Temp (° K.) | Heat content cal/gm | Gas Volume Moles/100 g |
|---|---|---|---|---|---|
| Mg | 10 | 1 | 3117 | 866 | 2.01 |
| Mg | 11 | 0 | 3186 | 889 | 2.00 |
| $BKNO_3$ | — | — | 3020 | 860 | 1.13 |
| $BKNO_3$* | — | — | 3311 | 815 | 1.60 |

*enhanced $BKNO_3$ - contains titanium hydride and potassium perchlorate

Gas yields for enhancer compositions according to the present invention are improved over those achieved by the conventional $BKNO_3$ enhancer compositions. The gas yield for a typical $BKNO_3$ enhancer composition is 1.13 moles per 100 gms of enhancer. The gas yields for compositions according to this invention are from 1.9 to 2.4 moles per 100 gm of enhancer or a 68 to 112% increase over the conventional $BKNO_3$ enhancer. This aspect of the present invention allows for the pre-pressurization of the inflator prior to the ignition of the main charge. This aspect also provides for improved performance in the hybrid system.

The theoretical flame temperatures of the prior art enhancers are generally in the range of from about 2,800° K to 3,300° K at 100 atmospheres. The theoretical flame temperatures of the enhancer compositions according to this invention are from 2,800° K to about 3,200° K. at 100 atmospheres.

The combustion characteristics of the enhancer compositions of the present invention produce a sufficient quantity of gas and molten metal to ignite the main gas generant charge and most importantly, provide pre-pressurization of the inflator vessel which enhances the burning properties of the main gas generant.

The following specific embodiments of the present invention are intended to be representative and not to limit the scope of the invention.

EXAMPLE I

This experiment was conducted to evaluate the enhancer compositions of the present invention in providing reliable ignition of the main gas generant charge over a wide range of temperatures.

A 15 kg batch of an enhancer composition according to the present invention was prepared by dry mixing 9.6 kg of strontium nitrate, 0.3 kg of mica, 3.9 kg of 5-AT and 0.15 kg of boron nitride in a batch-type vibratory grinder (Sweco) for 120 minutes. The mix was then divided into 5 sub-mixes for safety purposes. Each sub-mix weighed about 2790 gms. 210 gms of atomized aluminum with a particle size of about 22 to 30 microns was then added to each sub-mix and thereafter dry blended for 20 minutes in a V blender. The mixture was then placed in a plough-type mixer and about 15 weight % water was added to form agglomerated material that was then passed through a granulator with an 8 mesh screen.

The granules were placed on a tray and dried at 120° C. in an explosion proof oven for about 3 hours. The water content after drying was about 0.5 weight %. The dried granules were then passed through a granulator using a 20 mesh screen. The samples were then pelletized with a rotary pellet press. The pellets were about 5 mm in diameter, 1.2 mm high and weighed about 51 to 53 mg each.

The gas generant was prepared in a manner similar to the enhancer except the composition consisted of 32 weight %

5-AT, 8 weight % potassium nitrate, 44 weight % strontium nitrate and 16 weight % mica. The gas generant was also pelletized as described above.

1.5 gm of the enhancer composition was placed in a standard test inflator together with 43 gms of the gas generant tablets. The test inflator was fitted with a standard electrical squib ignition initiator and a pressure transducer to measure the pressures generated inside the inflator after ignition. The inflator also contained a stainless steel knitted wire slag filter and pellet cushion, and a stainless steel burst foil over the exit ports of the inflator with a thickness of about 0.025 mm. The test inflator was placed on a stand inside a test chamber or tank which was temperature controlled. Three inflators each were tested at temperatures of minus 30° C., +22° C. and +80° C. This wide range of temperatures is required to ensure that inflators will function properly over the range of temperatures that motor vehicles will experience.

A plot of inflator combustor pressure in pounds per square inch (psi) and kPa versus time in milliseconds (ms) is found in FIG. 1. This plot shows a successful series of runs. Successful inflator performance is determined by a very quick increase in pressure in the first 5 milliseconds. Repeatable, consistent performance is highly desirable as inconsistent, highly variable performance creates a danger of incomplete inflation of the airbag. A range of performance over a temperature range is not acceptable. As can be seen in FIG. 1, the performance at minus 30° C., 22° C. and 80° C. were all very similar. This experiment demonstrates that the enhancer composition according to the present invention reliably and consistently ignites the main gas generant charge over a wide range of temperatures.

Comparative

Figure 2:
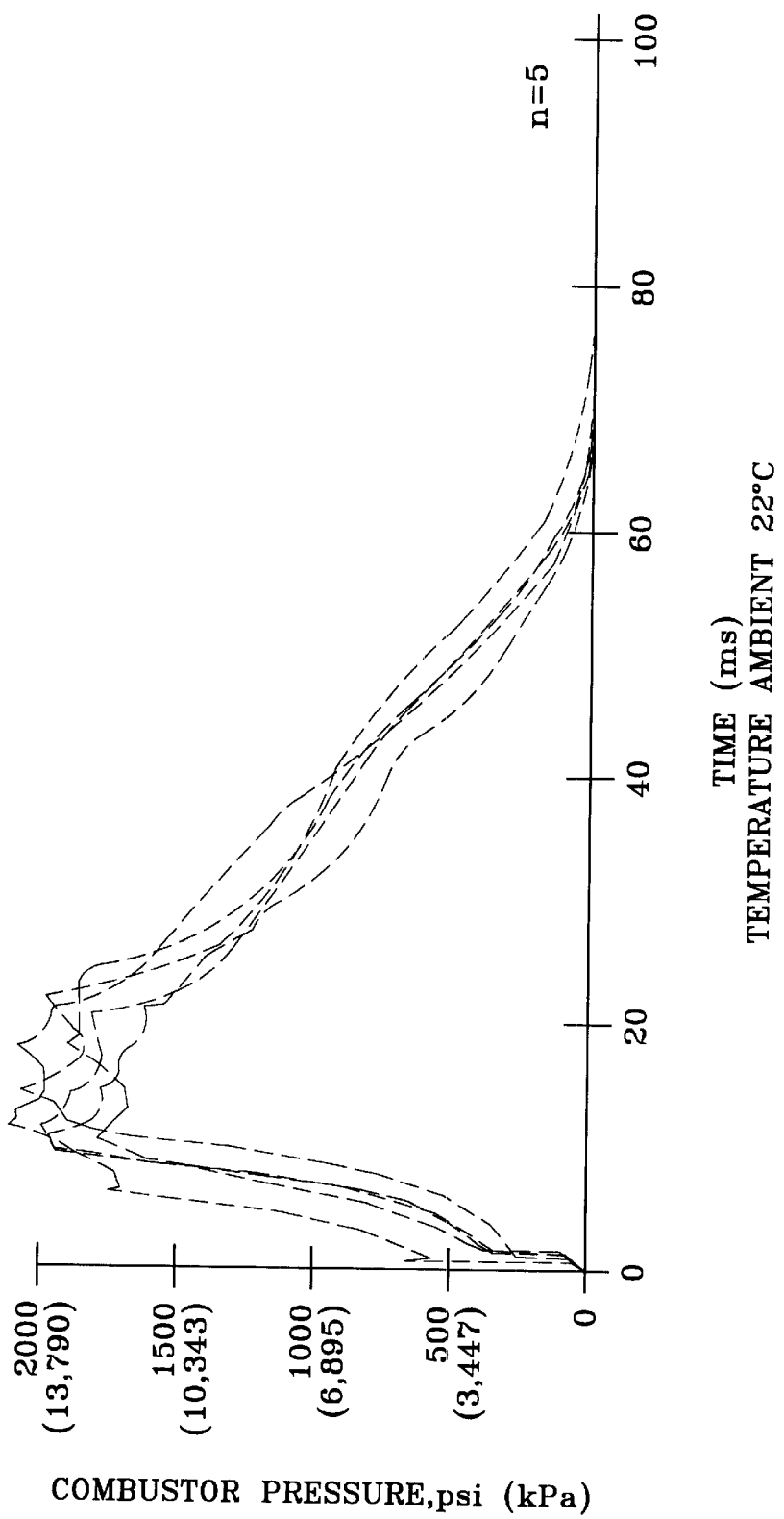
FIG. 2 is a graphical representation of pressure versus time data obtained from the use of an enhancer composition outside the scope of the present invention as set forth in the comparative portion of Example II.

To provide a comparison with the enhancer composition of the present invention to the conventional $BKNO_3$ enhancer, the same housing, gas generant and test was performed except that 1.0 gm of powdered $BKNO_3$ replaced the enhancer according to the invention. Tests at only ambient temperature were conducted. FIG. 2 illustrates a highly variable performance resulting from poor performance of the enhancer composition. The pressure chart of FIG. 2 shows that the $BKNO_3$ enhancer failed to fully pressurize the inflator within 10 ms and that within the five (5) runs, there was a substantial amount of variability even at 22° C. The results of this comparative experiment would be considered a failure.

EXAMPLE II

The procedure of Example I was repeated except the 5-AT of the enhancer formulation was replaced by NTO (3-nitro-1,2,4-triazol-5-one). The enhancer composition is prepared in a similar manner except the composition consisted of 28 weight % NTO, 62 weight % $Sr(NO_3)_2$, 2 weight % mica and 8 weight % aluminum. The combustion temperature is 2938° K with a heat content of 774.65 calories/gm. Test housings are successfully fired with results similar to those seen in FIG. 1.

EXAMPLE III

The procedure of Example I was repeated except the 5-AT based gas generant composition was replaced with a typical sodium azide based gas generant. Five test housings were prepared and successfully fired with results as seen in FIG. 4. In a manner similar to that of Example I and as illustrated in FIG. 1, the enhancer of the invention successfully and reliably ignited the azide based main gas generant.

INDUSTRIAL APPLICABILITY

The motor vehicle industry is constantly in search of improvements to airbag inflator systems. The enhancer composition of the present invention improves the cost and reliability of these devices while also enhancing the gas producing properties of known gas generants. The present invention is an improvement over the conventional ignition enhancers through a novel combination of specific fuels, oxidizers and metals. The novel enhancer compositions of the present invention are stable, formable into various shapes and reliably ignite the main gas generant charge.

While specific embodiments of the invention have been shown and described in detail to illustrate the application of the principles of the invention, it will be understood that the invention may be embodied otherwise without departing from such principles.

What is claimed is:

1. A hybrid inflator comprising:
   (a) a vessel for the storage of a gas; and
   (b) a gas heater composition wherein said gas heater composition consisting essentially of:
      (i) 5-AT as fuel, at a concentration of from about 15 to 35 weight %;
      (ii) strontium nitrate as oxidizer, at a concentration of from about 50 to 80 weight %;
      (iii) a metal selected from aluminum, titanium, boron, magnesium and mixtures thereof at a concentration of about 5 to 15 weight %; and
      (iv) a processing aid selected from silicon dioxide, mica, boron nitride, talc, molybdenum disulfide, metal stearate salts and mixtures thereof at a concentration greater than 0 and up to about 7 weight %.

2. The inflator according to claim 1 wherein said metal is aluminum.

3. The inflator according to claim 1 wherein said processing aid is a mixture of mica at a concentration of about 2 weight % and boron nitride at a concentration of about 1 weight %.

4. The inflator according to claim 2 wherein said 5-AT is present at a concentration of about 26 weight %, said strontium nitrate is present at a concentration of about 64 weight % and said aluminum is present at a concentration of about 7 weight %.

* * * * *